United States Patent [19]

Pyle et al.

[11] 4,399,577
[45] Aug. 23, 1983

[54] MACHINE FOR CLEANING GRATING OVER BARN MANURE TROUGH

[76] Inventors: Clayton C. Pyle, 4425 W. 84th St., Bloomington, Minn. 55431; Bobby R. Wigelsworth, 4336 High View Pl., Minnetonka, Minn. 55343

[21] Appl. No.: 308,914

[22] Filed: Oct. 5, 1981

[51] Int. Cl.³ ............................................. A47L 11/18
[52] U.S. Cl. .................................... 15/49 C; 15/79 A
[58] Field of Search ................ 15/49 C, 50 C, 79 R, 15/82, 83, 320, 340, 79 A

[56] References Cited

U.S. PATENT DOCUMENTS

| | | | |
|---|---|---|---|
| 853,525 | 5/1907 | Stewart . | |
| 1,644,189 | 10/1927 | Hendricks | 15/50 C |
| 1,892,347 | 12/1932 | Jerome . | |
| 2,558,590 | 6/1951 | Smith | 15/50 C X |
| 2,765,483 | 10/1956 | LeBlanc | 15/49 C |
| 2,862,224 | 12/1958 | Swanson et al. | 15/50 C X |
| 3,045,267 | 7/1962 | Wagner | 15/50 |
| 3,079,285 | 2/1963 | Rockwell | 134/10 |
| 3,321,331 | 5/1967 | McNeely | 134/6 |
| 3,346,896 | 10/1967 | Arones | 15/50 C |
| 3,584,329 | 6/1971 | Cravits | 15/302 |
| 3,654,656 | 4/1972 | Romagosa | 15/50 C X |
| 3,828,390 | 8/1974 | Cater | 15/321 |
| 3,871,051 | 3/1975 | Collier | 15/321 |
| 3,985,103 | 10/1976 | Gallei | 119/28 |
| 4,041,567 | 8/1977 | Burgoon | 15/50 C |
| 4,136,420 | 1/1979 | Cypher et al. | 15/321 |
| 4,282,622 | 8/1981 | Rosendall et al. | 15/41 R |

FOREIGN PATENT DOCUMENTS

| | | | |
|---|---|---|---|
| 1164315 | 5/1958 | France | 15/50 C |
| 2440229 | 7/1980 | France | 15/49 C |
| 2014039 | 8/1979 | United Kingdom | 15/50 C |

Primary Examiner—Edward L. Roberts
Attorney, Agent, or Firm—Kinney, Lange, Braddock, Westman & Fairbairn

[57] ABSTRACT

A machine for cleaning a grate over dairy barn manure troughs uses a rotating cylindrical brush with dense, fibrous, resilient bristles to scrub manure from the grate. The cylindrical brush is mounted in a housing which rides on a pair of wheels. The cleaner is moved forward and backward by the contact of the rotating brush through the barn floor. An electric motor drives the brush through a chain drive. A pair of flexible protective flaps mounted in front and behind the rotating brush prevent splashing of manure. Water nozzles are mounted on the front end and rear end of the machine for spraying the grate. A nozzle is also mounted inside of the housing for spraying the brush as it rotates. A handle extends from the rear of the machine and is offset to the walkway side wall of the machine to keep the operator away from kicking animals. The animal stall side wall of the machine is strengthened to withstand kicks.

18 Claims, 5 Drawing Figures

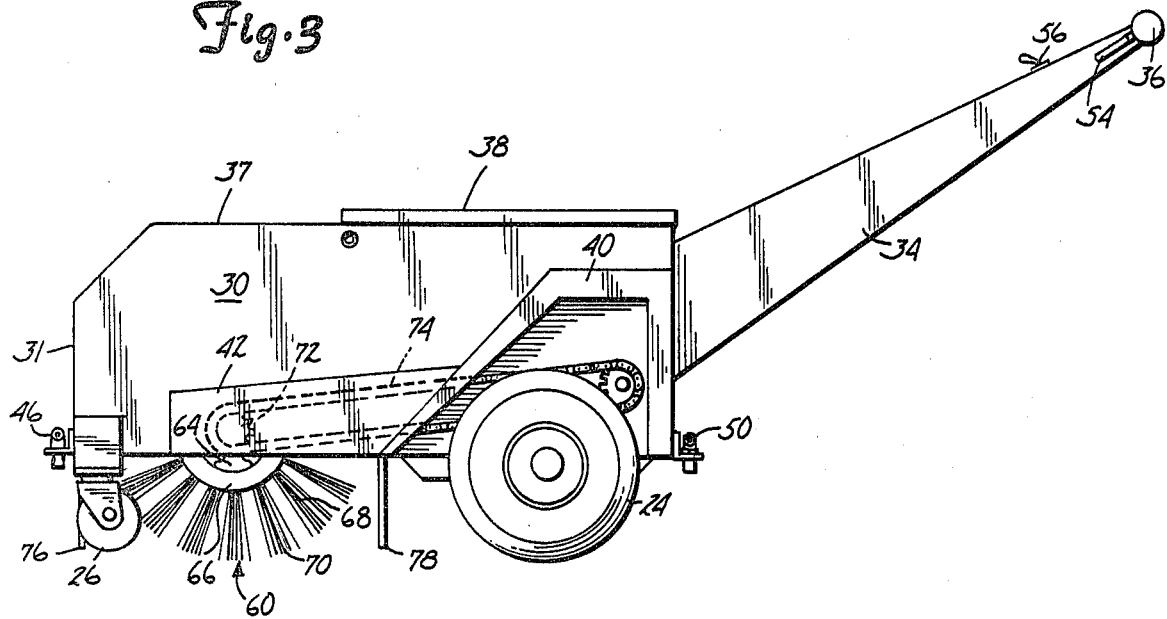
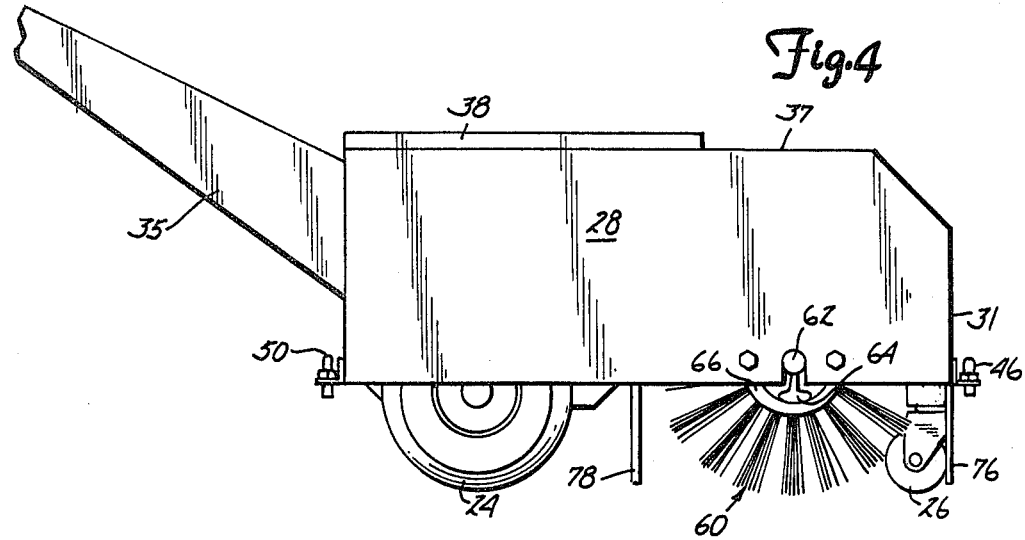
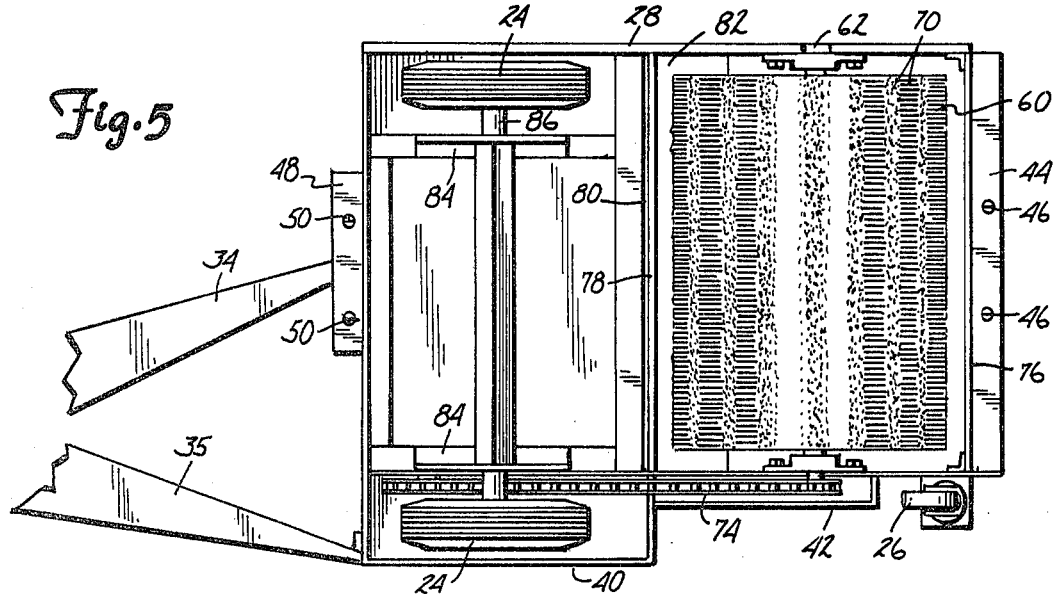

MACHINE FOR CLEANING GRATING OVER BARN MANURE TROUGH

BACKGROUND OF THE INVENTION

1. Field of the Invention

This invention relates to machines for cleaning grates over dairy barn manure drain troughs.

2. Description of the Prior Art

In recent years, farmers and agribusiness have made giant-sized strides in automating the time-consuming and physically demanding tasks of dairy operations. For example, the morning and evening chore of milking is speeded up considerably with modern pipeline systems that reduce handling and measurably improve sanitation. Confinement of cows inside the barn is another modern dairy management practice. Facilities custom built for this, called tie stall barns, are designed to house cows inside the barn year around.

This style of barn requires a system for removing manure while still maintaining good sanitation. The usual system is an open gutter covered by grates. The gutter is usually cleaned by a slurry system. In one style facility called a New York tie stall barn, manure falls through the grates into a pit beneath the floor. From the pit, manure is periodically pumped outside to a holding area or hauled away. However, this system still leaves dairy farmers with the time-consuming and difficult job of hand-scraping every single grate for the entire gutter length of the barn.

These gutters or troughs are covered, for safety and sanitation reasons. Manure falls through the grate and is carried away in the trough. The manure, however, often tends to stick to the grate. This is a safety hazard, as well as a sanitary problem. The farmer must frequently run the cows out of the barn and clean the grate. The common method in the prior art is to hose down the grate with water and scrape off the residual manure with a hoe, rake, or shovel. The cows must be removed from the barn or there is a risk that an excited or annoyed animal will kick the sweeper. Driving out the cows for the cleaning process and the subsequent returning of the cows take an inordinate amount of time for such a chore. As a result, the grates are usually removed only on a yearly basis and cleaned with a high-pressure hose.

A search has found that many cleaning machines have been developed for special purpose applications. The following 11 U.S. Pat. Nos. were located during the search:

853,525 5/14/07 Stewart
1,644,189 10/14/27 Hendricks
1,892,347 12/27/32 Jerome
3,045,267 7/24/62 Wagner
3,079,285 2/26/63 Rockwell
3,321,331 5/23/67 McNeely
3,584,329 6/15/71 Cravits
3,828,390 8/13/74 Cater
3,871,051 3/18/75 Collier
3,985,103 10/12/76 Gallei
4,136,420 1/30/79 Cyphert et al Ten of these patents are for special cleaning purposes which have little to do with the present barn grate cleaning problem. Cater and Cyphert et al are carpet cleaners. Cravits is specifically for cleaning moving stairways. Rockwell and Wagner are for cleaning surfaces. None of these five patents discloses a rotating cylindrical brush.

Five patents were found which employed rotating cylindrical brushes. Collier applies cleaning fluid and uses a rotating brush to scrub the carpet. Hendricks scrubs a floor with a rotating brush. Stewart sweeps and scrubs with a rotating cylindrical brush. Jerome is a floor washer which applies liquid and scrubs a surface. McNeely is designed to clean a bowling lane. None of these five patents has a rotating cylindrical brush adapted for heavy duty use such as barn cleaning.

The only patent which deals with barn cleaning is Gallei. This employs a rotating brush which is moved through a manure channel to clean the channel. It is not designed to clean the grate above the channel. The Gallei patent mentions that it is known to clean the grid above the manure channel by means of a cylindrical rotary brush with a horizontal axis of rotation.

SUMMARY OF THE INVENTION

A machine for cleaning grate over a barn manure trough includes a housing with a brush chamber for enclosing a rotating cylindrical, grate-engaging brush with dense, fibrous, resilient bristles. The brush is mounted with a horizontal axis of rotation which is perpendicular to a longitudinal axis of the machine. A first flexible, floor-engaging, protective flap is mounted perpendicular to the longitudinal axis of the machine in front of the brush and a second such flap is mounted behind the brush. Means are provided to rotate the brush, the preferred means being a 12 volt DC electric motor connected to the brush with a chain drive. Water nozzles spray the grate from the front and rear of the machine. A nozzle also sprays the brush as it rotates. Means are provided to deliver water to the nozzles. In a preferred embodiment, this is a hose connection to provide water at ground temperature.

The housing is strengthened to withstand kicks from barn animals. An operator handle extends from the rear of the machine. The handle is offset to a walkway side wall of the barn, so that the operator is a safe distance away from kicking animals. The guide wheel is mounted on the front corner of the housing near the intersection of the front and the walkway side wall longitudinal panels. The guide wheel maintains proper height of the housing for proper brush contact with the grate. The machine is moved by the rotation of the brush. The motor is preferably reversible so that the machine can be moved in either direction.

BRIEF DESCRIPTION OF THE DRAWINGS

FIG. 3 is a side elevational view of the machine from the walkway side wall.

FIG. 4 is a partial side elevational view of the machine from the animal stall side wall.

FIG. 5 is a partial bottom plan view of the machine.

DETAILED DESCRIPTION OF THE PREFERRED EMBODIMENTS

Figure 1:
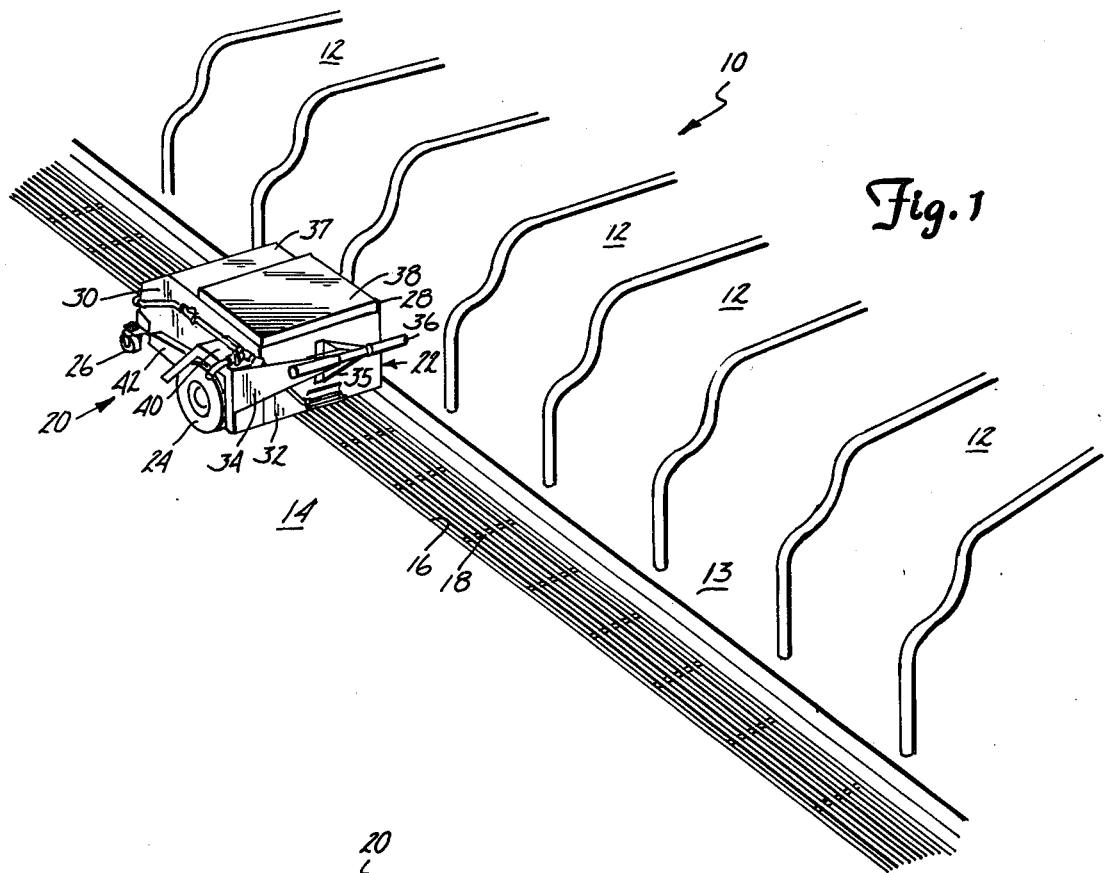
FIG. 1 is a perspective view of barn stalls and a grate covering a manure trough, with the machine of the present invention for cleaning the grate in operating position.

In the interior of a barn 10 as shown in FIG. 1, a series of stalls 12 is used to contain and restrain farm animals such as pigs or cows. In barn floor 13, a walkway area 14 extends through the barn 10 along the stalls 12. Animals are led into stalls 12 so that the rear end of the animal is toward walkway area 14. A manure trough or gutter 16 in barn floor 13 extends along the length of the row of stalls 12. Trough 16 is positioned to receive manure excreted by the animals in stalls 12. Trough 16 is covered by a grate 18.

A cleaner machine 20 of the present invention for cleaning grate 18 is shown in its normal operating position. Cleaner 20 has a housing 22 which is supported by a pair of wheels 24 and a guide wheel 26. Cleaner 20 moves on barn floor 13 along grate 18 to clean off residual manure, even while farm animals are in stalls 12. Cleaner 20 is reinforced to withstand kicks from the animals.

The housing 22 of cleaner 20 has a stall side wall 28, which is preferably made of heavy gauge steel to withstand animal kicks. In the example shown, the entire housing 22 is made of 3/16 inch steel. Guide wheel 26 is mounted on a walkway side wall 30 of cleaner 20 near a front end wall 31. Mounted on a rear end wall 32 of housing 22 are left and right handle supports 34 and 35. Attached to handle supports 34 and 35 is operator handle 36. Housing 22 has a top 37 and removable force-fit top cover 38 which seals the cleaner 20 and allows access to the interior machinery.

Figure 2:
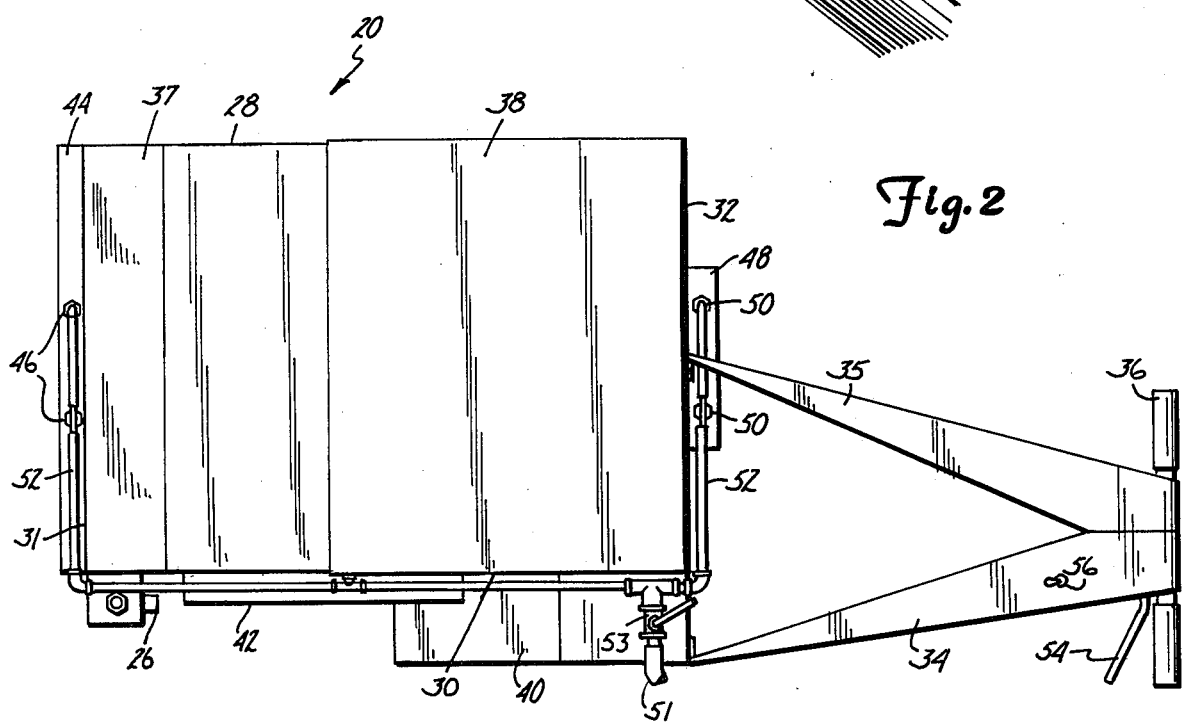
FIG. 2 is a top plan view of the machine of the present invention.

Operator handle 36 is offset from the center of the rear end wall 32 of cleaner 20, so that the operator can run the cleaner 20 from walkway area 14. The top view of FIG. 2 better shows the offset of operator handle 36. In this position, the operator is safe from kicks from annoyed animals. On the walkway side wall 30 of cleaner 20 is a wheel cover 40 as shown in FIGS. 1 and 2. Left handle support 34 is attached to rear end wall 32 at the far walkway side of wheel cover 40. The right handle support 35 is attached to rear end wall 32 at approximately its midpoint. This arrangement puts the operator handle 36 well to the walkway side wall 30 of cleaner 20, for clearance of the operator from the animals in stalls 12.

Walkway side wall 30 also has a chain guard 42 which, like all other operational parts, is positioned on the opposite side of cleaner 20 from any danger of damage due to animal kicks.

Figure 6:
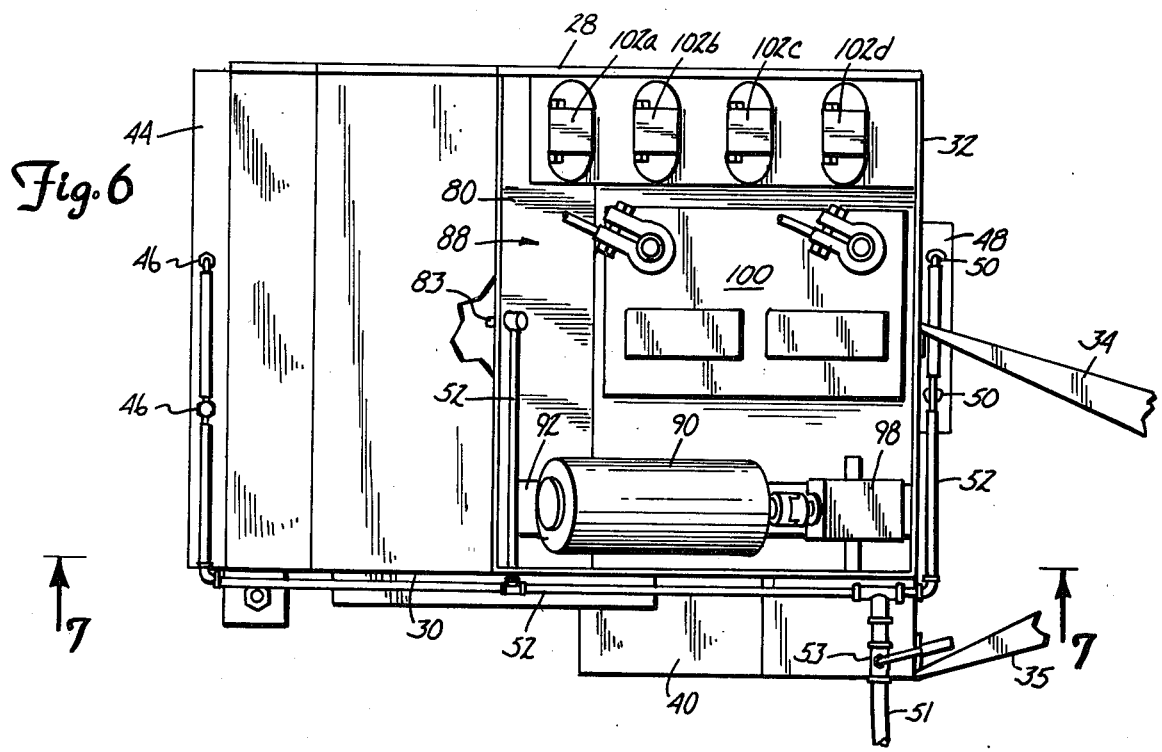
FIG. 6 is a partial top plan view of the machine with the cover removed.
Figure 7:
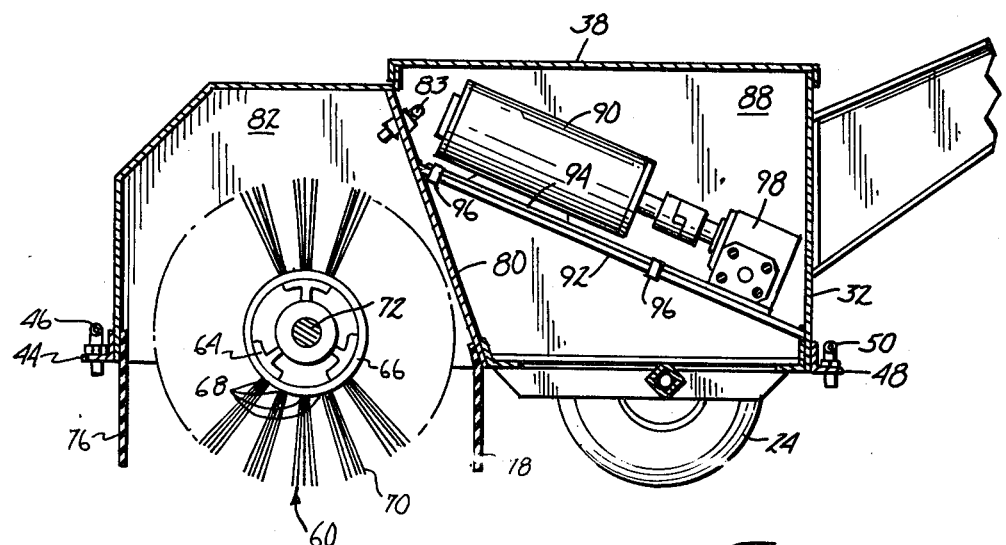
FIG. 7 is a partial cross sectional view taken on the line 7—7 of FIG. 6.

The front end wall 31 carries a front nozzle bar 44 on which are mounted two front nozzles 46, preferably spaced 10 inches apart. Mounted on rear end wall 32 is a rear nozzle bar 48 which carries two rear nozzles 50. Nozzles 50 are also preferably spaced 10 inches apart. These nozzles 46 and 50 are preferably fan nozzles which spray water down on the grate 18 during the cleaning process. Nozzles 46 and 50 are preferably the type known in the art as 11010 nozzles. The first three digits, "110", indicate the angle of spray of the fan nozzle. In this case they spray a range of 110 degrees. The subsequent two digits, "10", indicate that it is a one gallon/minute flow rate nozzle. Each pair of nozzles, when symmetrically spaced 10 inches apart, sprays the entire width of the grate 18. As best shown in FIG. 6, a supply hose 51, which is preferably a common garden hose provides water under pressure from the normal barn water source. Supply hose 51 is connected to a feeder hose 52 by a gate valve 53 which turns the flow of water on and off and controls its volume.

All operation of cleaner 20 can be done from the safe walkway area 14. Cleaner 20 is activated by a clutch handle 54 which is mounted on operator handle 36. The direction of movement of the cleaner 20 is controlled by a reversing switch 56 which is mounted on left handle support 34.

The side views in FIGS. 3 and 4 show the position of a rotatable brush 60. Brush 60 has a central horizontal axle 62 which is rotatably mounted on sides 28 and 30 of housing 22. Radial members 64 extend out from axle 62 to support a cylindrical bristle holder 66. Bristle holder 66 and radial members 64 are preferably made of rust-free material, such as aluminum. Rows 68 of bristles 70 extend radially outwardly from bristle holder 66. Rows 68 are arranged parallel to axle 62. In the preferred embodiment, there are eighteen rows 68 around the periphery of bristle holder 66.

Bristles 70 are preferably made of a non-metallic silicon carbide fiber, which is well known in the car washing apparatus art and is commercially known as Tynex-A brand fiber. This fiber is stiff and retains its shape very well. The bristle diameter is preferably forty mil. This particular bristle withstands water well. It does not become limp under constant spray. It is very resilient so that it will return to its normal straight configuration after being bent. Bristles 70 must be strong to clean manure from grate 18 but must have enough flexibility so that brush 60 does not bounce when bristles 70 hit a crossbar in the grate 18. Each row 68 contains about 30 percent more fibers than would normally be used in a car washing apparatus.

Brush 60 is preferably about sixteen inches in diameter. Bristle holder 66 is about eight inches in diameter and the exposed portion of bristles 70 is about four inches long. Barn grates are commonly 16, 18 or 20 inches wide. Therefore, brush 60 is preferably 20 inches wide, along axle 62.

At the walkway side wall of axle 62 is a hub 72. Brush 60 is rotated by a chain 74 which engages hub 72. Chain 74 operates inside chain guard 42.

A front splash guard 76 and rear splash guard 78, mounted under housing 22 parallel to axle 62, prevent water and loose manure from flying out of cleaner 20. Front splash guard 76 extends below front end wall 31 in front of brush 60. Rear splash guard 78 is mounted behind brush 60. The splash guards 76 and 78 are constructed of flexible rubber-like material.

The bottom view of FIG. 5 shows a transverse wall 80 mounted across housing 22. Wall 80, along with walkway side wall 30, stall side wall 28, front end wall 31, and top 37, forms a brush chamber 82, open to the floor 13, which encloses the rotating brush 60. Transverse wall 80, like stall side wall 28, is made of strong metal (preferably steel) to withstand animal kicks.

A brush nozzle 83 is mounted in brush chamber 82 on transverse wall 80. Brush nozzle 83 sprays water from feeder hose 52 onto brush 60 to clean it as it rotates. Brush nozzle 83 is preferably a 14210 type flooder nozzle, according to the designation system discussed above. Nozzle 83 is a one gallon per minute nozzle which sprays a 142 degree range, with one gallon/minute flow rate. This wide area of spray covers the entire width of brush 60.

Attached to the bottom of housing 22 is a pair of wheel supports 84. A wheel axle 86 is rotatably mounted in wheel supports 84 and carries wheels 24.

Wheels 24 are free-rotating. The cleaner 20 moves by contact of brush 60 with barn floor 13 and grate 18.

In the top plan view of FIG. 6, top cover 38 has been removed. A motor chamber 88 is formed by transverse wall 80, stall side wall 28, walkway side wall 30, and rear end wall 32. Mounted in motor chamber 88 are motor 90, ramp 92, motor mounting plate 94, motor mounting plate fasteners 96, gear box 98, battery 100, and relays 102a–102d. Ramp 92 is attached near the bottom of rear end wall 32 and is attached to transverse wall 80 at a higher point. Therefore ramp slants downward from the front of motor chamber 88 toward the rear end wall 32. Motor 90 and gear box 98 are attached to motor mounting plate 94. Motor mounting plate 94 is slidably attached to ramp 92. The position of mounting plate 94 on ramp 92 is maintained by two fasteners or bolts 96. When fasteners 96 are loosened, motor mounting plate 94 can be moved up or down along ramp 92. As motor mounting plate 94 slides down ramp 92, the distance from gear box 98 to hub 72 increases. This means that the tension on the chain 74 between gear box 98 and hub 72 increases. Therefore, to remove or adjust chain 74, fasteners 96 are loosened and motor mounting plate 94 is moved up ramp 92 toward the front of chamber 88.

Motor 90 is preferably a twelve-volt permanent magnet electric motor of the type commonly known in the trade as a PMG motor. Motor 90 is preferably a three-quarter horsepower/46 amp motor. Gear box 98 gears down motor 90 in a 20:1 ratio. The combination of motor 90 and gear box 98 in the preferred embodiment rotates brush 60 at about ninety rpm.

The starting and stopping of motor 90 and the direction of rotation of brush 60 are controlled by the four relays 102a–102d, which are controlled by clutch handle 54 and reversing switch 56. One pair of the relays 102a–102d controls the motor 90 in each direction. A wire (not shown) is connected between each terminal of battery 100 and each terminal of motor 90, for a total of four wires. One of the relays 102a–102d is connected in each of these wires. Reversing switch 56 selects a pair of the relays 102a–102d to complete a circuit including battery 100 and motor 90.

For instance, relay 102a connects a first terminal of battery 100 with a first terminal of motor 90. Relay 102b connects a second terminal of battery 100 with a second terminal of motor 90. Relay 102c connects the first terminal of battery 100 with the second terminal of motor 90 and relay 102d connects the second terminal of battery 100 with the first terminal of motor 90. Thus, when reversing switch 56 changes the pair of relays 102a–102b or 102c–102d selected, it reverses the terminals of motor 90 to which power is supplied. This reverses the direction of rotation of the motor 90.

To prepare cleaner 20 for operation, the battery 100 is charged on a normal twelve-volt battery charger. In the preferred embodiment shown, one deep cycle battery 100 will hold its charge for approximately ninety minutes, which is sufficient time for normal barn cleaning. Water supply hose 51 is attached to the barn water system. Machine 20 is then positioned over grate 18 as shown in FIG. 1. Machine 20 can be operated in either direction along grate 18. By squeezing clutch handle 54, the operator starts motor 90. Motor 90, through gear box 98, activates chain 74, which rotates brush 60. Two relays 102a–102b are used to control the forward motion. Reversing switch 56 is used to reverse the direction of brush 60 and cleaner 20, by activating the alternate pair of relays 102c–102d. The rotation of brush 60 moves cleaner 20 along the grate 18. Nozzles 46 and 50 spray water down on the grate, so that, no matter which direction cleaner 20 is moving, there will always be water sprayed before and after brushing. Splash guards 76 and 78 prevent water and loosened manure from spraying around the barn.

The entire cleaning operation can be done with the animals still in stalls 12. This saves all the time formerly spent removing the animals and replacing them. The quiet electric motor 90 does not alarm the animals. Because the cleaning with cleaner 20 is more efficient and thorough than hand scraping, it is possible to clean only once every other day instead of the daily scraping formerly employed. The spraying and scrubbing action loosens manure from the bottom side of the grate also. Formerly, hand scraping could not adequately clean anything but the top surface.

With cleaner 20 of the present invention, no heat, chemicals, or high pressure are required for cleaning the grate 18. The grate 18 need not be removed from the trough 16 for occasional thorough cleaning with a high-pressure hose. Thorough, complete cleaning is achieved on a regular basis, without time-consuming hard labor.

The cleaner 20 is also adapted for cleaning the barn floor. Residual manure is quickly scrubbed from a concrete floor by the cleaner 20 constructed according to the present invention.

Although the present invention has been described with reference to preferred embodiments, workers skilled in the art will recognize that changes may be made in form and detail without departing from the spirit and scope of the invention.

What is claimed is:

1. For use in a barn having animal stalls, an apparatus for cleaning grate over barn floor manure troughs comprising:
    a housing adapted for movement;
    a cylindrical, grate-engaging brush having a cylindrical core of about eight inches in diameter and dense, fibrous, resilient silicon carbide bristles of about forty mils in diameter and about four inches in length projecting outward from the core, the brush being mounted in the housing for rotation about a first horizontal axis generally perpendicular to the movement of the housing;
    means for rotating the brush;
    means for spraying water generally downward onto the grate;
    means for spraying water on the brush;
    a pair of rotatable wheels connected to the housing for rotation about a second horizontal axis which is parallel to and rearward of the first horizontal axis; and
    a rotatable guide wheel mounted on the housing forward of the brush.

2. The apparatus of claim 1, wherein the core is made of non-rusting material.

3. The apparatus of claim 2, wherein the non-rusting material is aluminum.

4. The apparatus of claim 1 wherein the bristles are arranged in a plurality of parallel rows around the periphery of the core.

5. The apparatus of claim 1, wherein the brush is about 20 inches wide along its horizontal axis.

6. The apparatus of claim 1 wherein the resilient bristles have generally the resiliency properties of Tynex-A brand fibers.

7. The apparatus of claim 1, wherein the means for spraying water onto the grate includes a front nozzle positioned forward of the brush and a rear nozzle positioned rearward of the brush.

8. The apparatus of claim 1 and further comprising a flexible, floor engaging protective flap generally parallel to the axis of the brush mounted below the housing.

9. The apparatus of claim 1, wherein the means for rotating the brush includes an electric motor and a chain drive for transmitting rotational power from the motor to the brush.

10. The apparatus of claim 9 and further comprising an offset operator handle mounted on the housing, being offset away from the animal stalls, and a control mounted on the offset operator handle so that it is spaced away from the animal stalls, the control being movable by an operator to control operation of the means for rotating the brush.

11. A machine for cleaning grate over barn manure troughs comprising:
- a housing, including a brush chamber, the housing having a front end, a longitudinal animal-facing side wall, a longitudinal walkway side wall, and a rear end wall;
- a pair of rotatable ground-engaging wheels mounted on an axis on the housing transverse to the longitudinal sides;
- a rotatable, cylindrical, ground-engaging brush having dense, fibrous, resilient bristles, the brush being mounted within the brush chamber with its axis of rotation perpendicular to the longitudinal sides;
- means for rotating the brush;
- first nozzle means mounted in front of the brush for directing water at the grate;
- second nozzle means mounted behind the brush for directing water at the grate,
- third nozzle means mounted on the housing for directing water at the brush;
- means for supplying water to the first, second, and third nozzle means; and
- flexible, floor engaging protective flap means generally parallel to the axis of the brush extending below the housing.

12. The apparatus of claim 11 wherein the means for rotating the brush includes an electric motor and a chain drive connecting the electric motor to the brush.

13. The apparatus of claim 11 and further comprising an offset operator control handle mounted on and extending rearwardly from the rear end wall, the handle being offset to the walkway side wall of the machine.

14. The apparatus of claim 11 and further comprising a rotatable, ground-engaging guide wheel mounted on the housing near the intersection of the front end and the walkway longitudinal side.

15. The apparatus of claim 11 and further comprising an operator handle extending rearwardly from the housing and means, mounted on the operator handle, for controlling operation of the means for rotating the brush.

16. The apparatus of claim 11 wherein the means for supplying water to the nozzle means includes a feeder hose connected to each nozzle means.

17. The apparatus of claim 16 wherein the means for supplying water to the nozzle means further includes a valve in the feeder hose for receiving a hose connected to the barn water supply.

18. An apparatus for cleaning grate over barn floor manure troughs, the apparatus comprising:
- a housing;
- a cylindrical grate-engaging brush mounted in and partially surrounded by the housing for rotation about a first horizontal axis;
- rotation means for rotating the brush about the first axis;
- a pair of freely rotatable undriven ground-engaging wheels mounted on opposite sides of the housing and aligned for rotation about a second horizontal axis which is parallel to and rearward of the first horizontal axis;
- a guide caster wheel mounted on and extending downward from a front corner of the housing forward of the brush;
- a flexible floor-engaging protective flap mounted on and extending below the housing generally parallel to the brush;
- means mounted on the housing forward of the brush for spraying water generally downward onto the grate;
- means mounted on the housing rearward of the brush for spraying water generally downward onto the grate; and
- means mounted within the housing for spraying water onto the brush.

* * * * *